US012755170B2

(12) United States Patent
Ferreira et al.

(10) Patent No.: US 12,755,170 B2
(45) Date of Patent: Oct. 6, 2026

(54) AUTOMATIC ASSESSMENT OF UNSUPERVISED MODELS VIA TRUST SCORING IN UNSUPERVISED EDGE DOMAINS

(71) Applicant: Dell Products L.P., Round Rock, TX (US)

(72) Inventors: Paulo Abelha Ferreira, Rio de Janeiro (BR); Vinicius Michel Gottin, Rio de Janeiro (BR); Pablo Nascimento da Silva, Niteroi (BR)

(73) Assignee: Dell Products L.P., Round Rock, TX (US)

( * ) Notice: Subject to any disclaimer, the term of this patent is extended or adjusted under 35 U.S.C. 154(b) by 882 days.

(21) Appl. No.: 17/812,638

(22) Filed: Jul. 14, 2022

(65) Prior Publication Data

US 2024/0020549 A1 Jan. 18, 2024

(51) Int. Cl.
*G06N 5/04* (2023.01)
*G06N 5/022* (2023.01)

(52) U.S. Cl.
CPC ............... *G06N 5/04* (2013.01); *G06N 5/022* (2013.01)

(58) Field of Classification Search
CPC ........... G06N 5/04; G06N 5/022; G06N 20/00
See application file for complete search history.

(56) References Cited

U.S. PATENT DOCUMENTS 6,393,362 B1 5/2002 Burns
8,169,335 B2 5/2012 Frederick et al.
9,547,969 B2 1/2017 Beggs et al.
9,576,480 B1 2/2017 Shoshan
9,671,777 B1 6/2017 Aichele et al.
9,674,498 B1 6/2017 Mukherjee et al.
9,764,472 B1 * 9/2017 Ebrahimi Afrouzi ........................ G05D 1/0251
10,525,882 B2 1/2020 Bernstein et al.
10,661,795 B1 5/2020 Li et al.
10,885,775 B2 1/2021 Herson et al.
11,086,328 B2 8/2021 Keivan et al.
11,165,954 B1 11/2021 Beach et al.
11,232,294 B1 1/2022 Banerjee et al.
11,577,741 B1 2/2023 Reschka et al.
12,012,318 B2 6/2024 Gottin et al.
(Continued)

FOREIGN PATENT DOCUMENTS

CN 106651884 B 10/2019
CN 111383209 A 7/2020
(Continued)

OTHER PUBLICATIONS

"How Accurate Are RFID Systems?"—RFID Journal; (Accessed Oct. 28, 2022).
(Continued)

*Primary Examiner* — Jennifer N Welch
*Assistant Examiner* — Amy P Hoang
(74) *Attorney, Agent, or Firm* — Workman Nydegger

(57) ABSTRACT

Model assessment is disclosed. When a model operates, tuples are transmitted to a central node. The central node can process the tuples received from multiple nodes to generate an efficiency score for the model. The efficiency score reflects how the inference of the model correlates to operator actions. Models whose assessment is below a threshold score may be retrained at least for certain classes.

18 Claims, 7 Drawing Sheets

(56) References Cited

U.S. PATENT DOCUMENTS

| | | | |
|---|---|---|---|
| 12,093,815 | B2 | 9/2024 | Otsuki et al. |
| 12,094,451 | B1 | 9/2024 | Zhang et al. |
| 2009/0109049 | A1 | 4/2009 | Frederick et al. |
| 2010/0208064 | A1 | 8/2010 | Liu et al. |
| 2010/0228427 | A1 | 9/2010 | Anderson et al. |
| 2011/0010023 | A1 | 1/2011 | Kunzig et al. |
| 2011/0093134 | A1 | 4/2011 | Emanuel et al. |
| 2011/0279261 | A1 | 11/2011 | Gauger et al. |
| 2012/0025964 | A1 | 2/2012 | Beggs et al. |
| 2012/0083947 | A1 | 4/2012 | Anderson et al. |
| 2014/0191869 | A1 | 7/2014 | Frederick |
| 2014/0324336 | A1 | 10/2014 | Prokhorov et al. |
| 2015/0145661 | A1 | 5/2015 | Beggs et al. |
| 2015/0227862 | A1 | 8/2015 | Chandrasekar et al. |
| 2015/0228066 | A1 | 8/2015 | Farb |
| 2016/0129592 | A1 | 5/2016 | Saboo et al. |
| 2016/0180713 | A1 | 6/2016 | Bernhardt et al. |
| 2017/0094227 | A1 | 3/2017 | Williams et al. |
| 2017/0120906 | A1 | 5/2017 | Penilla et al. |
| 2017/0161635 | A1 | 6/2017 | Oono et al. |
| 2017/0297569 | A1 | 10/2017 | Nilsson et al. |
| 2017/0337813 | A1 | 11/2017 | Taylor |
| 2017/0337820 | A1 | 11/2017 | Glatfelter et al. |
| 2017/0356596 | A1 | 12/2017 | Frederick |
| 2018/0203727 | A1 | 7/2018 | Jarvis et al. |
| 2019/0043351 | A1 | 2/2019 | Yang et al. |
| 2019/0073594 | A1 | 3/2019 | Eriksson et al. |
| 2019/0138895 | A1* | 5/2019 | Jin .......................... G06N 3/08 |
| 2019/0228312 | A1 | 7/2019 | Andoni et al. |
| 2019/0243371 | A1 | 8/2019 | Nister et al. |
| 2019/0268722 | A1 | 8/2019 | Elswick et al. |
| 2019/0317219 | A1 | 10/2019 | Smith et al. |
| 2020/0225673 | A1 | 7/2020 | Ebrahimi et al. |
| 2020/0257310 | A1 | 8/2020 | Du et al. |
| 2020/0311559 | A1 | 10/2020 | Chattopadhyay et al. |
| 2020/0334837 | A1 | 10/2020 | Feigl et al. |
| 2020/0380406 | A1* | 12/2020 | Dickens ................. G06N 20/00 |
| 2020/0410281 | A1 | 12/2020 | Goel et al. |
| 2021/0034836 | A1 | 2/2021 | Haimovitch-Yogev et al. |
| 2021/0089762 | A1 | 3/2021 | Rahimi et al. |
| 2021/0124981 | A1 | 4/2021 | Kim |
| 2021/0192810 | A1 | 6/2021 | Paysan et al. |
| 2021/0273858 | A1 | 9/2021 | Radovanovic et al. |
| 2021/0295154 | A1 | 9/2021 | Groh |
| 2022/0066456 | A1 | 3/2022 | Ebrahimi et al. |
| 2022/0089372 | A1 | 3/2022 | Phillips et al. |
| 2022/0114637 | A1 | 4/2022 | Bersia |
| 2022/0114642 | A1 | 4/2022 | Bersia |
| 2022/0129712 | A1 | 4/2022 | Sallee et al. |
| 2022/0129758 | A1 | 4/2022 | Sallee |
| 2022/0138943 | A1 | 5/2022 | Zhu et al. |
| 2022/0231919 | A1 | 7/2022 | Pandey et al. |
| 2022/0253647 | A1* | 8/2022 | Perkins .................. G06N 20/20 |
| 2022/0330896 | A1* | 10/2022 | Min ..................... A61B 5/0024 |
| 2022/0394531 | A1 | 12/2022 | Jeong et al. |
| 2022/0409991 | A1 | 12/2022 | Ohashi et al. |
| 2023/0030039 | A1 | 2/2023 | Drapeko et al. |
| 2023/0068523 | A1 | 3/2023 | Santra et al. |
| 2023/0154166 | A1 | 5/2023 | Pauli et al. |
| 2023/0159027 | A1 | 5/2023 | Pronovost |
| 2023/0177951 | A1 | 6/2023 | Mubarek et al. |
| 2023/0221942 | A1 | 7/2023 | Zhang et al. |
| 2023/0305564 | A1 | 9/2023 | Gottin et al. |
| 2023/0334326 | A1 | 10/2023 | Haimovitch-Yogev et al. |
| 2023/0339459 | A1 | 10/2023 | Chi-Johnston et al. |
| 2023/0368129 | A1 | 11/2023 | Gottin et al. |
| 2023/0409881 | A1 | 12/2023 | Heitzmann et al. |
| 2024/0003235 | A1* | 1/2024 | Bruns .................... G06N 3/092 |
| 2024/0190473 | A1 | 6/2024 | Akella et al. |
| 2024/0214314 | A1* | 6/2024 | Zhao ..................... H04L 47/127 |
| 2024/0278797 | A1 | 8/2024 | Agrawal et al. |
| 2024/0311731 | A1 | 9/2024 | Caron et al. |

FOREIGN PATENT DOCUMENTS

| | | | |
|---|---|---|---|
| CN | 112613586 | A | 4/2021 |
| CN | 112945227 | A | 6/2021 |
| CN | 114460537 | A | 5/2022 |
| CN | 114527676 | A | 5/2022 |
| CN | 114530058 | A | 5/2022 |
| CN | 115410354 | A | 11/2022 |
| CN | 111785329 | B | 5/2024 |
| DE | 102021200452 | A1 | 7/2022 |
| KR | 10-2372487 | B1 | 3/2022 |
| WO | 2011/092229 | A1 | 8/2011 |
| WO | 2018/116248 | A1 | 6/2018 |
| WO | 2022/156947 | A1 | 7/2022 |
| WO | 2023/287176 | A1 | 1/2023 |
| WO | 2023/016537 | A1 | 2/2023 |
| WO | 2024/041726 | A1 | 2/2024 |

OTHER PUBLICATIONS

B. Kim, C. Kang, J. Kim, S. Lee, C. Chung and J. Choi, "Probalistic vehicle trajectory prediction over occupancy grid map via recurrent neural network," in 20th International Conference on Intelligent Transporation Systems (ITSC), 2017.

C. Hegde, S. Dash and P. Agarwal, "Vehicle Trajectory Prediction using GAN," in Fourth International Conference on I-SMAC (IoT in Social, Mobile, Analytics and Cloud)(I-SMAC) , 2020.

Gal, Yarin, and Zoubin Ghahramani. "Droupout as a Bayesian approximation: Representing model uncertainty in deep learning." international conference on machine learning. PMLR, 2016.

Inpixon—Bluetooth Location Tracking & Positioning, https://www.inpixon.com/technology/standards/bluetooth-low-energy (Accessed Oct. 28, 2022).

Link Labs—"The Complete Active RFID Overview", Mar. 14, 2018.

S. Srikanth, J. Ansari, R. Ram, S. Sharma, J. Murthy and K. Krishna, "Infer: Intermediate representations for future prediction," in IEEE/RSJ International Conference on Intelligent Robots and Systems (IROS) , 2019.

W.-H. Chung, G. Chakraborty, R.-C. Chen and C. Bornand, "Object Dynamics from Video Clips using YOLO Framework," 2019 IEEE 10th International Conference on Awareness Science and Technology (iCAST), Morioka, Japan, Oct. 23-25, 2019, pp. 1-6, (Year: 2019).

B. Alexe, T. Deselaers and V. Ferrari, "Measuring the objectness of image windows," IEEE transactions on pattern analysis and machine intelligence, vol. 11, No. 34, pp. 2189-2202, 2021.

B. McMahan, E. Moore, D. Ramage, S. Hampson and B. y Arcas, "Communication-efficient learning of deep networks from decentralized data.," In Artificial Intelligence and Statistics, pp. 1273-1282, 2017.

C. L. Zitnick and P. Dollár, "Edge boxes: Locating object proposals from edges.," European conference on computer vision, pp. 391-405, 2014.

J. Bernstein, Y. X. Wang, K. Azizzadenesheli and A. Anandkumar, "signSGD: compressed optimisation for non-convex problems," CoRR, vol. abs/1802.04434, 2021.

K. M. Rashid and A. H. Behzadan, "Risk Behavior-Based Trajectory Prediction for Construction Site Safety Monitoring," Journal of construction engineering and management, 2018.

Li, "Federated learning: Challenges, methods, and future directions," IEEE Signal Processing Magazine, vol. 37, No. 3, pp. 50-60, 2020.

Oza, P., & Patel, V. M. (2019). "C2ae: Class Conditioned Auto-Encoder for Open-set Recognition." In Proceedings of the IEEE/CVF Conference on Computer Vision and Pattern Recognition (pp. 2307-2316).

P. Tang, X. Wang, A. Wang, Y. Yan, W. Liu, J. Huang and A. Yuille, "Weakly supervised region proposal network and object detection," Proceedings of the European conference on computer vision (ECCV), 2018.

U.S. Appl. No. 17/585,055, tilled, Edge-Enabled Trajectory Map Generation, filed Jan. 26, 2022.

(56) References Cited

OTHER PUBLICATIONS

U.S. Appl. No. 17/663,423, tilled, “Unsupervised Leaming For Real-Time Detection of Far Edge Mobile Device Trajectories”, filed May 14, 2022.
Liu et al., “T-C3D: Temporal Convolutional 3D Network for Real-Time Action Recognition” AAAI, 2018, (Year: 2018).
Wikipedia, Autoencoder, https://en.wikipedia.org/wiki/Autoencoder, Jan. 10, 2021.
He, Chaoyang, et al. “Federated Learning for Internet of Things” IEEE Internet of Things Magazine 5.1 (2021): 24-29. (Year: 2021).
Mirus et al., “Detection of abnormal driving situations using distributed representations and unsupervised learning”, Oct. 2020, European Symposium on Artificial Neural Networks, Computational Intelligence and Machine Learning, pp. 363-368 (Year: 2020).
Shekhar, “What Are L1 and L2 Loss Functions?”, Aug. 1, 2019, Outcome School, p. 1-4 (Year: 2019).

* cited by examiner

| *N* | *E* | *q* | *d* | *a* | *Timestamp* | *c* | *X* | *Y* | *Z* | *Sensor1* | *Sensor2* | ... |
|---|---|---|---|---|---|---|---|---|---|---|---|---|
| 0 | 0 | Dangerous | 0 | Brake | ... | 0 | ... | ... | ... | ... | ... | ... |
| 0 | 0 | Dangerous | 0 | Brake | ... | 0 | ... | ... | ... | ... | ... | ... |
| 0 | 0 | Dangerous | 0 | Accelerate | ... | 1 | ... | ... | ... | ... | ... | ... |
| 0 | 1 | Safe | 1 | Accelerate | ... | 1 | ... | ... | ... | ... | ... | ... |
| 0 | 1 | Safe | 1 | None | ... | 1 | ... | ... | ... | ... | ... | ... |

400

Figure 4

AUTOMATIC ASSESSMENT OF UNSUPERVISED MODELS VIA TRUST SCORING IN UNSUPERVISED EDGE DOMAINS

RELATED APPLICATIONS

This application is related to U.S. Ser. No. 17/663,423 filed May 14, 2022, Ser. No. 17/647,758 filed Jan. 12, 2022, Ser. No. 17/585,055 filed Jan. 26, 2022, and Ser. No. 17/812,605 filed Jul. 14, 2022, which are incorporated by reference in their entirety.

FIELD OF THE INVENTION

Embodiments of the present invention generally relate to logistics, event detection and assessing unsupervised models. More particularly, at least some embodiments of the invention relate to systems, hardware, software, computer-readable media, and methods for assessing unsupervised machine learning models that have been deployed to a domain.

BACKGROUND

Logistics in many different environments can be difficult to monitor and manage at least because many different objects in the environment may exist and/or operate simultaneously. Many of the objects in the environment, for example, are mobile in nature while other objects are stationary or fixed. As a result, care should be exercised to ensure that accidents or other problems do not occur. This can be difficult as many of the objects operate concurrently, and their relative positions may not be known to each other.

For example, mobile devices such as forklifts may operate in a warehouse environment. Forklift operators need to look out for each other in addition to taking care around other objects or hazards such as shelving or storage space, pillars, docks, pallets, and the like. Even if these forklift operators are able to communicate with each other, it is difficult to coordinate the movement of multiple forklifts and ensure that undesirable interactions do not occur. Further, a forklift can experience dangerous situations on its own, for example when turning too sharply or at an excessive speed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 discloses aspects of tuples that are based on sensor data and user actions and stored in table form;

DETAILED DESCRIPTION OF SOME EXAMPLE EMBODIMENTS

Figure 1:
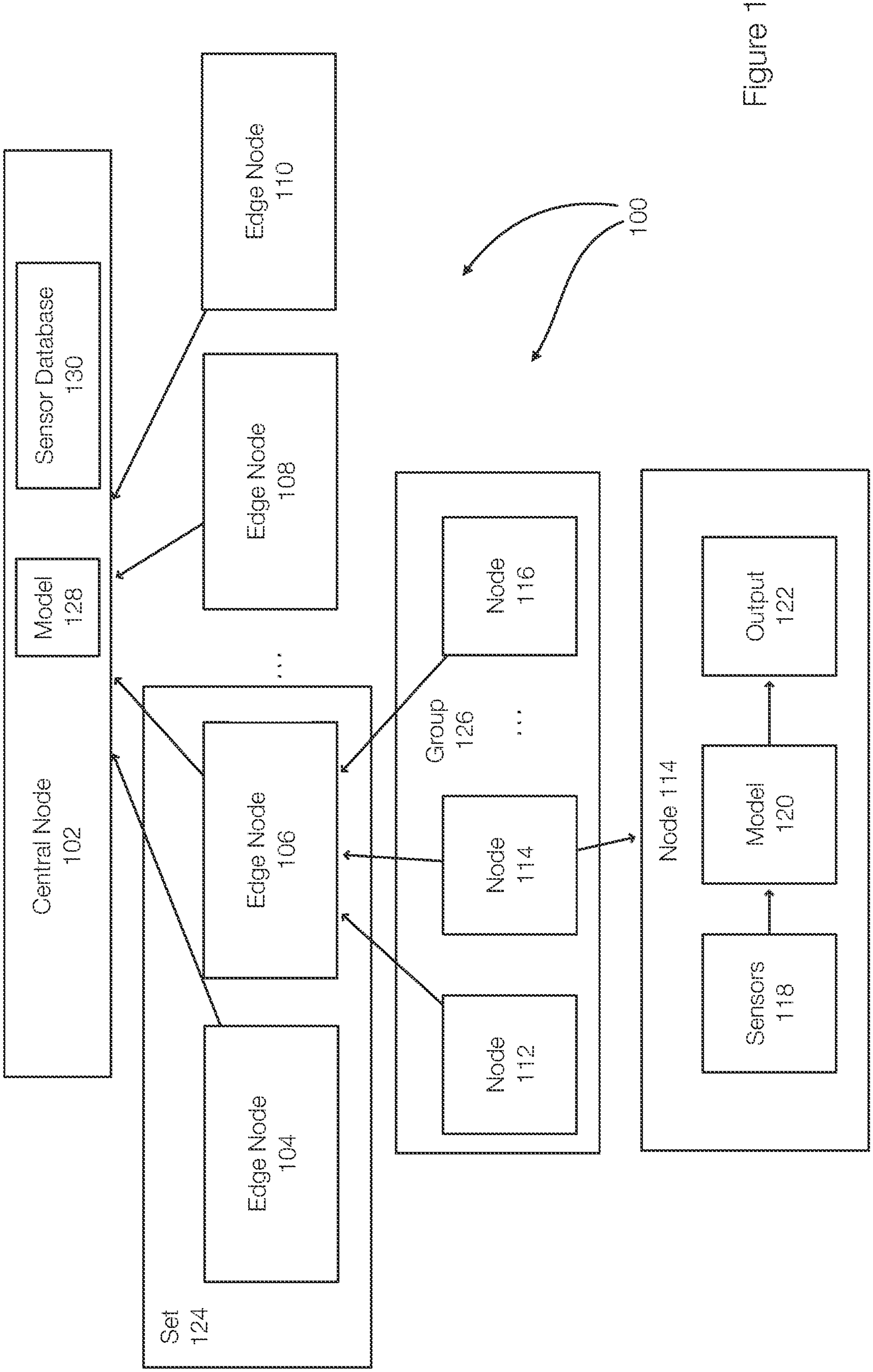
FIG. 1 discloses aspects of an environment in which machine learning models may be deployed to facilitate logistics operations in the environment.

Embodiments of the present invention generally relate to logistics, event detection and model assessment. More particularly, at least some embodiments of the invention relate to systems, hardware, software, computer-readable media, and methods for assessing machine learning models deployed in an environment.

Embodiments of the invention can be applied or implemented to provide or perform or enhance logistics operations in different types of environments. Generally, an environment may include objects, including mobile objects, movable objects, and/or stationary or static objects. These objects may include or be associated with sensors of varying types that may generate data. The data may be analyzed to detect events and/or to perform actions upon detecting an event.

The data generated by the sensors can be used to perform logistics operations, which include by way of example and not limitation, event detection operations, cornering detection operations, tracking operations, trajectory prediction operations, trajectory operations, alerting operations, positioning operations, object management operations, object monitoring operations, automation operations, safety operations, auditing operations, management operations, alerting or warning operations, model assessment operations, or the like or combination thereof. More specifically, embodiments of the invention perform logistics, including model assessment operations, based on sensor data generated at edge nodes in an edge environment.

Assessing models that are operating in an unsupervised manner is performed, in effect, by analyzing relationships between operator actions and model predictions. For example, a model may be configured to detect events such as cornering events. The model (or another model) may predict whether the cornering event is dangerous or safe. By capturing the operator's action, the models can be assessed. In the context of forklifts, for example, an appropriate user action in response to a dangerous cornering event is to perform braking. The data collected at the forklift can be correlated with the predictions of the models. If the model predicted or inferred that the cornering event is dangerous and the operator performed braking, this suggests that the model is adequately capturing the events in the domain or, at least, the operators are reacting to the actual environment in accordance with the model prediction. Over time and using the data associated with multiple events, the models can be scored or assessed.

Embodiments of the invention more specifically relate to a framework for adaptively and automatically assessing the performance of machine learning models in unsupervised and continuous settings, such as in an edge environment. A voting scheme is disclosed that may be based, by way of example only, on trajectory analysis and operator trust. In one example, an event detection model is trained and deployed to nodes in an environment. Data generated at the nodes is collected and aggregated at a central node. This allows actions taken by operators or drivers to be counted or determined relative to trajectory types. A scenario specific efficiency score can be determined and used to assess the model and determine model management actions.

By way of example, embodiments of the invention are discussed with respect to the operation of forklifts in a warehouse environment. Embodiments of the invention can be applied to other mobile devices, vehicles, or machines or the like in other environments.

Embodiments of the invention are achieved, in part, by equipping the objects in the environment with hardware such as sensors, processors, memory, networking hardware, or the like. In some examples, the objects may already be equipped with this type of hardware or portions thereof. The hardware may depend on the nature of the associated object. Mobile objects, for example, may be equipped with a different set of sensors compared to sensors or devices associated with a stationary or movable object. For example, hardware such as sensors, processors, memory, or the like may be integrated with a forklift. A pallet, in contrast, may only have an RFID (Radio Frequency Identification) tag.

The hardware (and/or any software thereon) may be referred to as a node. However, reference to a node may also constitute a reference to the object associated with the node and on which the node is attached. Reference to an object, such as a forklift, may refer to the object and/or the node.

Nodes in the environment may be referred to as far edge nodes as they operate on the edge of a network and may communicate with a central node operating at a near-edge infrastructure and/or in a datacenter. The central node is typically more computationally powerful than the edge nodes.

In one example, a node may be associated with sensors including position sensors, inertial sensors, cameras, or the like. The sensors or subsets thereof may generate data that allows movement to be detected, measured, predicted or inferred. A machine learning model may be trained to detect events using the sensor data. Embodiments of the invention are discussed with respect to events including cornering events but may be applied to other events. Embodiments may also relate to performing actions that are triggered by detected events, such as generating alerts, notifying device operators, sounding alarms, or the like.

In some embodiments, the edge nodes may each have sufficient hardware (e.g., processor, memory, networking hardware) to process data generated by the node's sensors and/or data about other nodes that is broadcast by a central node or by the other local nodes or other objects in the environment. The central node is able to perform more complex and thorough processing of the data generated at or by nodes in the edge environment.

As previously stated, each node in the environment may be associated with one or more sensors. A forklift, for example, may be associated with a node that includes or is associated with sensors positioned at various locations on the forklift. The sensors may be placed on the forks or arm (e.g., at the distal ends) and/or on the body of the forklift. This allows the position of the forklift (and of the arms) to be determined. Other information such as height, width, and length of the forklift, mast position, load weight, or the like may also be known or determined and taken into account.

However, the position data may be combined to form a single position and/or orientation of the forklift. For example, if the position is displayed on a monitor, the position of each forklift may be a short line to represent position and an arrow to represent orientation or direction.

The interface may be augmented with other data such as speed, whether the forklift is turning, whether the forks are moving up/down, or the like.

The node associated with a forklift may include or be connected to sensors such as cameras, temperature sensors, velocity sensors, motion sensors, acceleration/deceleration sensors, or the like or combination thereof. In general, the sensors associated with a forklift may generate data that can be used to detect objects, detect events or conditions, record events, determine a position/orientation/direction/trajectory of the forklift in the warehouse (or its vicinity), velocity, direction of travel, or the like. The sensor data may be processed at the node and/or at the central node to detect/identify objects and events, determine a position of the forklift and/or predict a trajectory of the forklift and/or perform localized decision-making operations.

Movable objects such as pallets or products may be associated with a node that includes RFID tags such that the positions of objects such as pallets can be read and tracked in the environment. Personal cellular phones may be used to track the positions/movement of people in the environment. The locations of other objects such as docks, corridors, or the like does not change and is known or programmed into the edge nodes and/or the central node that are performing logistics operations.

The warehouse is an example of an edge environment in which quickness and accuracy in decision making (including safety related decisions) is useful. Embodiments of the invention may detect objects, enable real-time object aware event detection, detect cornering events, or the like. Data originating at the nodes is collected from the nodes and processed using computing resources of the node. Each node, for example, may have a local model configured to generate inferences from locally generated sensor data. This may include detecting events, filtering data not relevant to specific event types, or the like. Data from all nodes may be received by a central node (e.g., container(s), physical machine(s), server(s), virtual machine(s)) operating at a near-edge infrastructure (or the cloud) and processed using resources of the near-edge infrastructure (or cloud).

FIG. 1 discloses aspects of an environment in which embodiments of the invention may be deployed or implemented. FIG. 1 illustrates a system (e.g., a logistics system) 100 that includes a central node 102(A) and edge nodes ($N_0, \ldots, N_n$), represented by edge nodes 104, 106, 108, and 110. The edge nodes may be groups into collections or sets ($C_0, \ldots, C_z$) such as a set 124 which includes the edge nodes 104 and 106. The edge nodes may be similar to the central node 102, but on a smaller scale in one example. For example, the set 124 may be associated with multiple warehouses and each edge node 104 and 106 is associated with a different warehouse.

Each of the edge nodes may associated with a set or group of nodes $$(E_0^j, \ldots, E_i^j).$$

For example, the edge node 106 ($N_j$) is associated with a group 126, represented by the nodes 112, 114, and 116

$$(E_0^j, E_1^j, \ldots, E_i^j).$$

The nodes 112, 114, and 116 are examples of far edge nodes. In this example, forklifts (or the nodes thereon) may be examples of far edge nodes.

The node 114

$$(E_1^i)$$

is further illustrates as including sensors 118 and a model 120, which generates an inference or an output 122. The model 122 may be representative of multiple models.

The central node 102 may have substantial storage and processing capabilities, particularly compared to the nodes 112, 114, and 116 in the group 126. The central node 102 may handle orchestration and communication. Embodiments of the invention account for nodes and/or operators that may operate in different environments. For example, an operator may operate different forklifts in two warehouses, operate the same forklift in both warehouses, or the like. Further, the same forklift may be operated by different operators in one or more warehouses. Embodiments of the invention may perform monitoring that is specific to an operator across multiple environments and can account for these distinctions.

The node 114 is equipped with sensors 118. The data generated by the sensors 118 may be locally stored as a sensor dataset $S^i$. In some examples, the data generated by the sensors 118 is provided to the central node 102, which may also have a copy of the model 120, represented as model 128. The sensor database 130 may store sensor data received from all of the nodes in the various environments.

At the node, only the recently generated data is generally stored. Local data may be deleted after transmission to the central node 102. Inferences for a time t are generated using the most recent sensor data. The output 122 (e.g., inference q) of the model 120(M) may be used for decision making with little delay at the node 114.

FIG. 1 illustrates an edge environment 100 (e.g., a warehouse) in which mobile devices (nodes) may operate. Forklifts in a warehouse is an example use-case of embodiments of the invention. The model 120 may be an event detection model that has been trained and deployed to the nodes 112, 114, and 116. For example, the model 120 may be ay configured to detect cornering events in the trajectories of mobile devices at the far edge and generate an inference as to whether the cornering event is dangerous or safe. Dangerous cornering is an example of a real-time event detection. The model 120 can be used to signal alarms for forklift operators when the cornering event is dangerous.

In this example, it may not be possible or feasible to collect labelled data. Requiring a forklift to perform a dangerous cornering in order to obtain labelled data is not worth the risk. Other examples of events that may be detected include excessive loads, dock entering or dock exiting, collisions, or more generally multiple different kinds of signals and alarms that may be raised.

Example sensors 118 include position sensors (at least one), and inertial sensors (at least one). The node 114 may include compute resources such as a processor, memory, networking hardware, or the like.

The central node 102 (e.g., implemented in a near edge infrastructure or in the cloud) may be configured to communicate with the node 114. The communication may be performed using radio devices through hardware such as a router or gateway or other devices (e.g., the edge node 106). Depending on the sensors and the configuration of the node, the communication may be one way. For example, a pallet associated with an RFID tag may simply be read to determine the pallet's position. The node 114 may also receive information from the central node 102 and use the information to perform various operations including logistics operations.

More specifically, the node 114 may be configured with sensors 118 of various types and with sufficient hardware (e.g., processor, memory) to implement and run a local model 120 using the data collected or generated by the sensors 118 of the node 114. Other nodes in the environment may also include or be associated with a local model.

For example, the sensors 118 may include position sensors that generate positional data that determine a position of the forklift in the environment. Positional data can also be collected as time series data, which can be analyzed to determine a position of the forklift, a velocity of the forklift, a trajectory or direction or travel, a cornering, or the like. The sensors 118 may also include inertial sensors that allow acceleration and deceleration to be detected in multiple directions and axes.

In one example, a map of the environment is generated and may be stored at the central node 102 and/or at the edge nodes. The system may be configured to map the position data received from the nodes into a map of the environment. This allows the positions of all nodes (objects) to be determined with respect to each other and with respect to the environment.

The central node 102 may include a near edge model 128 and a sensor database 130. The sensor database 130 may be used to store the information generated by or at the forklifts (the nodes 112, 114, and 116). The sensor database 130 may include a database for different sensor types. Thus, the sensor database 130 may include a position data database, an inertial database, and the like. In another example, the sensor database 130 may store all sensor data together and/or in a correlated form such that position data can be correlated to inertial data at least with respect to individual nodes and/or in time.

By way of example only, the local model 120 may generate an alarm or notification based on the data from the sensors 118. The model 120 may also be configured to generate an alarm based on the data from the sensors 118 and/or data from sensors associated with other nodes in the environment 100. The model 120 may also generate an alarm or notification based on communications from the central node 102.

In one example, the local model 120 is trained at the central node 102 and deployed to the relevant nodes 112, 114, and 118. The local model 120 is trained using available (historical) positioning and/or inertial measurement data (and/or other sensor data, which may include video data). After training, the local model 120 may be deployed to the nodes. In one example, the models 120 and 128 are the same. One difference is that the local model 120 may operate using locally generated data at the node 114 as input while the model 128 may use data generated from multiple nodes in the environment 100 as input (e.g., the sensor data in the sensor database 130).

Figure 2:
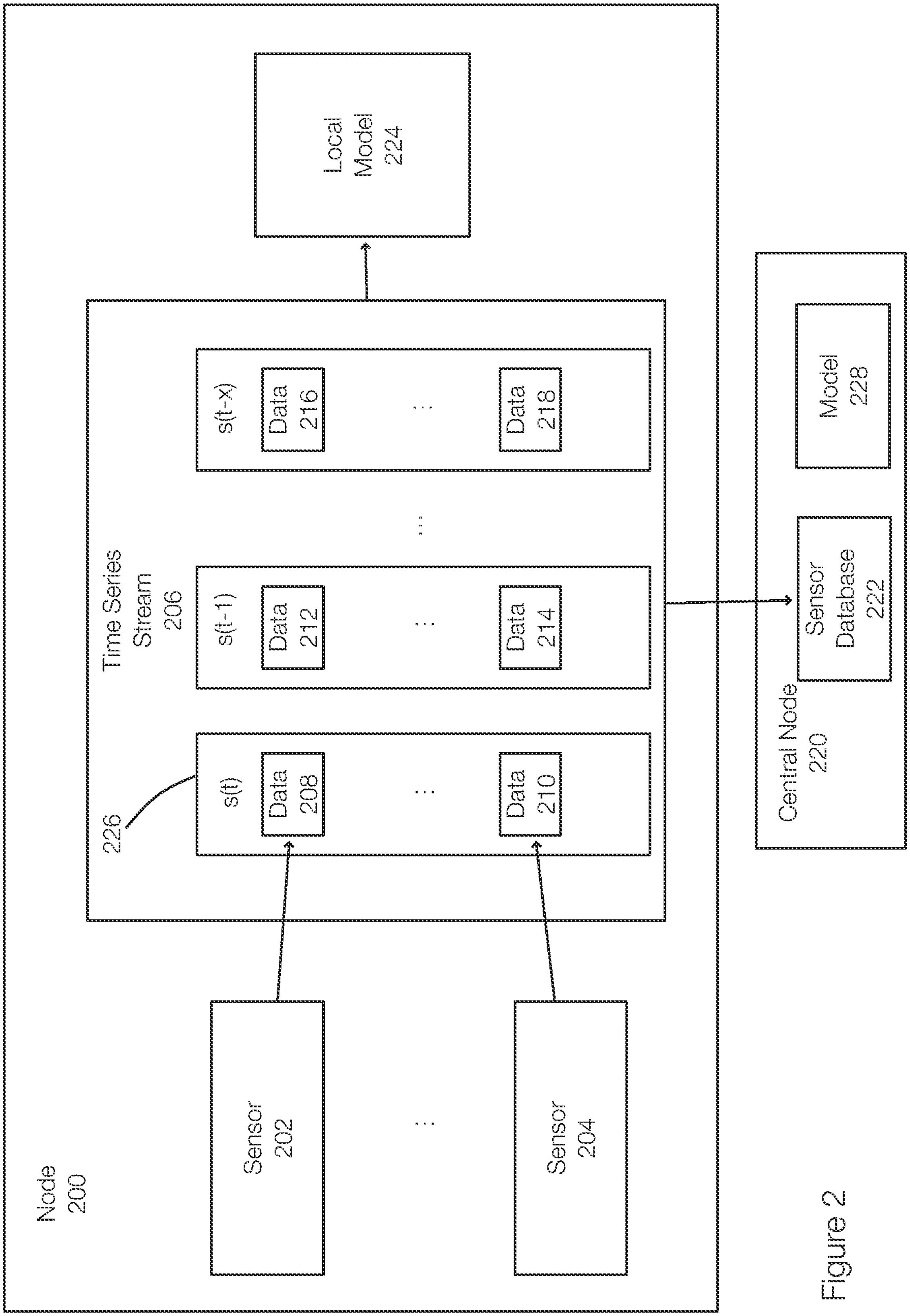
FIG. 2 discloses aspects of sensor data generated at a local node in an edge environment that is configured to generate inferences based on the generated sensor data.

FIG. 2 discloses aspects of a node associated with or integrated with an object and configured to operate in an environment and perform logistics operations. The node 200, an example of the node 114, may include sensors, represented by sensors 202 and 204. In this example, the sensors 202 and 204 may include position sensors and/or inertial sensors.

The node 200 collects, over time, multiple readings from the sensors 202 and 204. The data generated by the sensors 202 and 204 may constitute a time series stream 206. For example, the stream 206 includes readings at different times and the data collected at a particular time may be referred to as a collection. Thus, the time series stream 206 may include multiple collections such as the collection 226.

The data 208 and 210 in the collection 226 were collected at time s(t), the data 212 and 214 were collected at time s(t−1), and the data 216 and 218 were collected at time s(t−x). Each of the nodes that includes sensors may generate a similar sensor data stream. Data generated from the sensors 202 and 204 may be collected periodically, whenever a change in a sensor's data is detected (e.g., acceleration or deceleration is detected), or the like or combination thereof. Data from the sensors 202 and 204 may be collected at different times. Further, the sensors 202 and 204 may be grouped by type (e.g., position sensors, acceleration sensors, temperature sensors) and each data from each type or from designated groups of sensors may be collected separately. In one example, there may be a time series stream for positional data, a time series stream for inertial data, or the like. Further, time series streams may be coordinated in time. A collection of inertial data may correspond to a collection of position data.

The data collected from the sensors 202 and 204 is associated with or includes position data that can be mapped into coordinates of the environment 100. Thus, for the collection of data associated with time s(t), a position p(t) is associated with the collection 226 of data. When collecting data from the sensors 202 and 204, the collection of data is typically correlated to a position in the environment. In addition to position data, sensors may also provide inertial measurements of acceleration and deceleration. Other data, for objects such as a forklift, may include mast position, load weight, or the like. The data collected from an object may depend on the object.

The time series stream 206 may be transmitted to a central node 220, an example of the central node 102, and stored in a sensor database 222 of or associated with the central node 220. Thus, the time series stream 206 is available for use by the local model 224 to generate inferences, such as whether an event is occurring/has occurred. The time series data from all nodes is available to the model 228, which may perform the same or similar function as the local model 224 but may generate inferences based on data from multiple nodes.

The time series stream 206 may be collected periodically at the central node 220. This allows the central node 220 to store sensor data from each of the nodes in the sensor database 222. The central node 220 may store position/inertial data related to both dynamic and static nodes.

When detecting events such as cornering events, data including position data and inertial data (generally referred to as positional or position data) may be collected. The position or positioning data may include GPS (Global Positioning System) data, RFID (Radio Frequency Identification) or Wi-Fi triangulation data, or combination thereof. The inertial data may include inertial measurements of acceleration and deceleration. The inertial data may be obtained via inertial measurement unit (IMU) sensors. The positional data is used to detect cornering events. More specifically, embodiments of the invention focus on aspects of the positional data that represent cornering. However, embodiments of the invention can be adapted to detect other events that are represented by the positional data or from other sensors that be used to detect other types of events.

Figure 3:
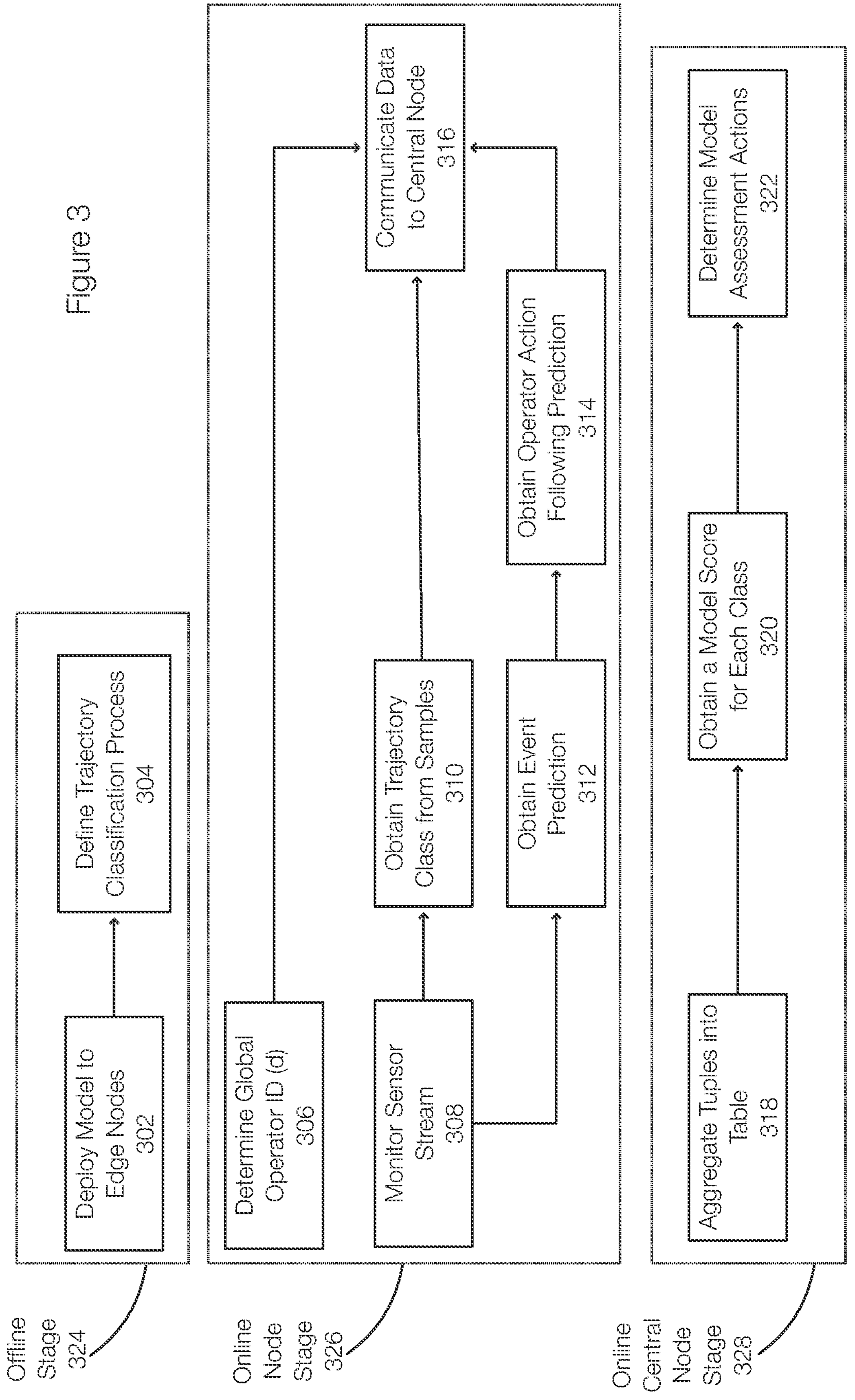
FIG. 3 discloses aspects of operating models in an environment and of assessing the operations of the models.

FIG. 3 discloses aspects of automatically assessing unsupervised models. Automatically assessing unsupervised models may include various stages or phases. Initially, an offline stage 324 may include obtaining and deploying 302 an event detection model to edge nodes. Examples of models may include models that may be deployed to edge nodes or nodes such as the nodes 112, 114, and 116 are disclosed in U.S. Ser. No. 17/663,423 filed May 14, 2022, and Ser. No. 17/647,758 filed Jan. 12, 2022, which are incorporated by reference herein in their entirety.

Next, a trajectory classification process is defined or performed 304 using the deployed model. Generally, the trajectory classification process includes considering a set of recent (e.g., most-recent) sensor collections (sensor data) as a trajectory. This set of sensor collections may be defined by positioning and other kinds of sensor data. Representative typical trajectories are elected or selected as classes. Generally, a set of typical trajectories can be determined. Each sub-trajectory is associated to exactly one typical trajectory. Aspects of trajectory classification in mobile edge devices is described in the appendix A, which is attached hereto and incorporated by reference in its entirety. Trajectory classification can also be performed using clustering and/or classification. The trajectory classification is performed at the edge nodes in one example.

The next stage is an online node stage 326. The stage 326 may be formed continuously and in parallel at each of the mobile edge devices (the nodes). Initially, the global identifier (d) of the mobile device operator is determined 306. The identifier (d) is unique across organizations in one example. The unique identifiers (d) of operators allows the operators to be coherent across sets (e.g., set 124) and their associated near-edge nodes (e.g., edge nodes 104 and 106). In the context of warehouses, the unique identifier (d) allows forklift operators to have a unique identifier across warehouses because the same operator may operate forklifts in different warehouses.

The node also monitors 308 the data received from the sensors at the node. Monitoring the data may include inputting recent data collections into the model. In some examples, the data is filtered before being input to the model. For example, the sensor data can be filtered (using a model or other processing) to identify a cornering event. The data of the cornering event can be provided to the model, which can generate an inference regarding whether the cornering is safe or dangerous. Thus, the sensor stream 5' is monitored by the node.

Using the sensor stream 5', a trajectory class can be obtained 310. In addition, the sensor stream 5' is input to the model to obtain 312 an event prediction. More specifically, the model may output an event indication q. The indication q may be a Boolean value indicating that the recent trajectory comprises an instance of the event of interest and may identify a status (e.g., dangerous/safe).

In addition to monitoring 308 the sensor stream 5, determining trajectory classes and generating predictions, any actions (a) performed by the operator are obtained. The actions of the operator are correlated to the trajectory and prediction or output of the model. These actions can be obtained from the device, by monitoring the device, or based on sensor outputs using an auxiliary model. For example, the model may generate a prediction that a trajectory is a dangerous cornering event. The operator may brake immediately following (or during) the cornering event. The braking action may be determined by monitoring the braking system, or by detecting a sharp deceleration from the sensor data, or the like or combination thereof.

After the model M yields a prediction, a tuple (d, c, q, a) is composed. The tuple relates the identity of the operator d to the class of each trajectory c, the event indication q, and the operator action indication a. The tuple is communicated 316 to the central node.

The central node stage 328 is performed using the tuples received from the nodes. In this example, the central node aggregates 3138 the tuples into a table. A score is then generated or obtained 320 for each trajectory class c. More specifically, the score relates how well actions of the operators reflect the model predictions for each trajectory class. Next, the model is assessed 322 based on the scores. In other words, the scores are an example of a model assessment and may be used for model management decisions.

FIG. 4 discloses aspects of a table generated from tuples received from nodes in an edge environment. More specifically, the table 400 represents an event-trajectory table used to store tuples that have been received at the central node. As previously stated, the central node typically has storage sufficient to store data received from nodes (or devices) operating in multiple environments. The tuples in the table 400 or subsets thereof may be deleted periodically. However, their aggregation may be stored for longer times.

The table 400 is an example of a structure that relates sensor data from each mobile device E and operator (d) to the operator's actions a at each of the near edge nodes N.

The table 400 illustrates a log of an operator's actions taken immediately after a detected event (e.g., a cornering event) was deemed dangerous or safe. Entries in the N column identify the index 0, 1, . . . of one of the near edge nodes $N_0$, $N_1$ . . . . Entries in the E column correspond to the index 0, 1, . . . of the far edge nodes $$E_0^j, E_1^j, \dots ,$$

associated to $N_j$.

The d column includes an identifier of the operator (e.g., the forklift driver). The a column includes actions correlated to the detected event. In this example, the actions include accelerate, brake, and none. The q column is an indication of an event q. The value, which may be Boolean, represent a prediction from the model that the detected cornering event is safe or dangerous. The table 400 may include other information such as a timestamp, X, Y, Z coordinates of the node, and sensor values or data associated with the detected event. New tuples incoming from nodes can simply be appended or added to the table 400.

In one example, the edge nodes may collect the tuples into intermediary trajectory tables and then periodically transmit the intermediary trajectory tables to the central node. The nodes may transmit the tuples to the near edge nodes when a signal is available, after collecting a pre-defined number of tuples, or the like.

Obtaining 320 the model or efficiency score for each trajectory class allows embodiments of the invention to assess whether the actions a of an operator d reflected the expected actions given a model prediction q. The efficiency score can be determined for each instance or case.

Figure 5:
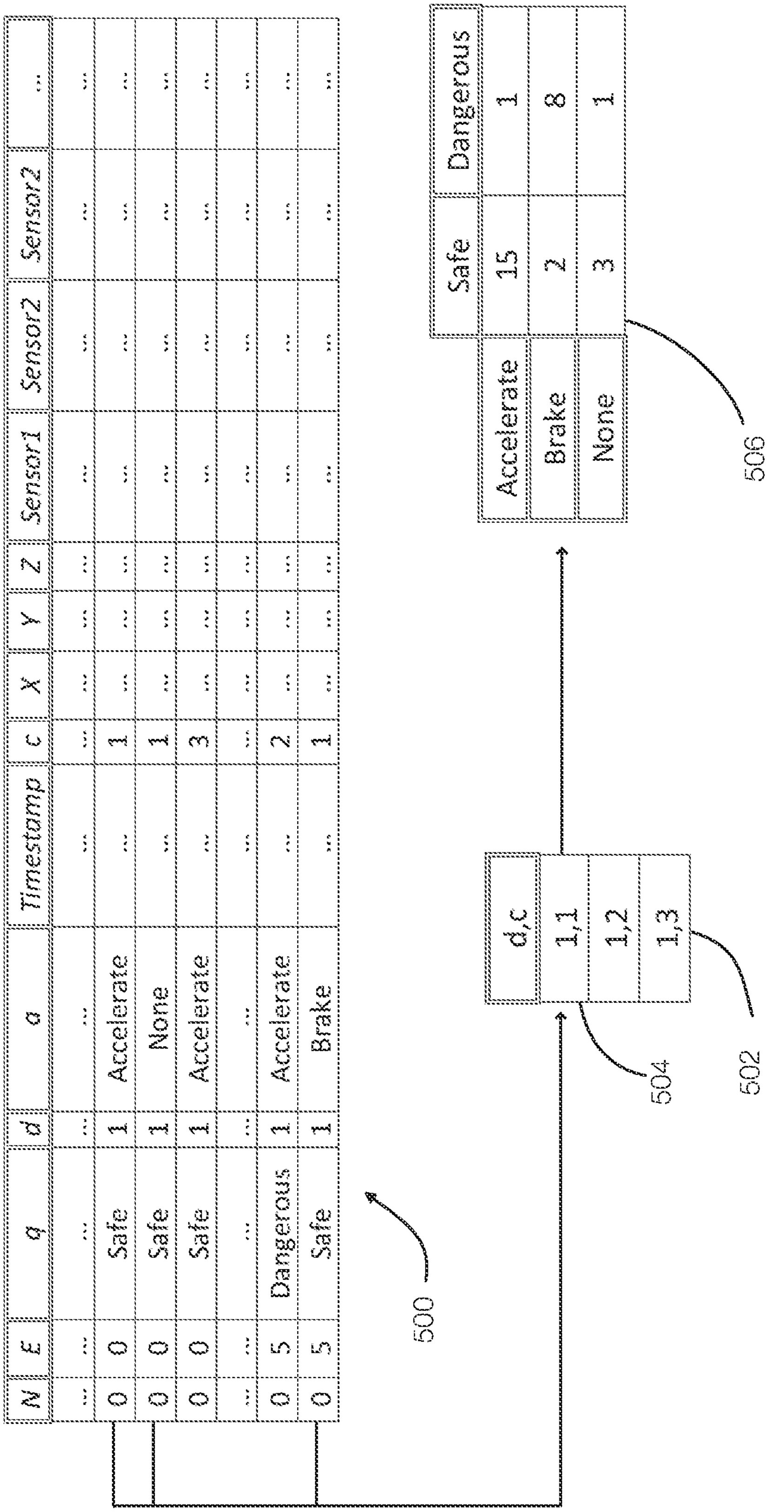
FIG. 5 discloses aspects of a prediction action table generated from a table of tuples.

FIG. 5 discloses aspects of determining an efficiency score for a model, which may be on a per class basis. As illustrated in the table 500, the entries in the table may be grouped by driver identifier d and trajectory c. Then for each action a, a count of the cases of the model prediction q can be obtained. The table 500 includes tuples, each of which is associated with an operator identifier d=1.

The table 500 may be used to generate a table 502 representing the trajectory classes associated with an operator. The table 502 illustrates that the table 500 includes at least three different trajectory classes associated with the operator whose identifier d is 1.

The table 502 is associated with a prediction-action table 504. In this example, the entries in the table 500 map to a specific entry 504 in the table 502. Although three entries are illustrated, these entries are representative of one or more entries. The entry 504 in the table 502 maps to the prediction-action table 506. The other entries in the table 502 may map to other prediction-action tables.

The table 506 illustrates, for a specific trajectory class, that the operator associated with e identifier d=1 accelerated 15 times when the prediction was safe and 1 time when the prediction was dangerous. The operator braked 2 times when the prediction was safe and 8 times when the prediction was dangerous. The operator performed no action 3 times when the prediction was safe and 1 time when the prediction was dangerous.

More specifically, the table 506 also captures relationships between model predictions and actions for a specific operator regardless of the device and regardless of the organization. As a result, the behavior of the forklift operator was captures regardless of which forklift the operator operated and regardless of the warehouse in which the operator was operating a forklift.

The tables 502 and 506 illustrate that as long as the same operator is performing a similar trajectory (c=1 for the table 506), the behavior is considered and included in the same prediction-action table. An operator may be associated with multiple prediction-action tables (e.g., one for each trajectory class).

An efficiency score can be determined from the prediction-action table 506. For each model prediction q, a set K of allowed actions under q is determined. In one example, K(Safe)={Accelerate, None} are allowed actions under a safe prediction. In the same example, K(dangerous) ={Brake}. This allows a scenario efficiency $F_q$ for the prediction to be determined as follows:

$$F_q = \frac{\sum_{a \in K(q)} a \cap q}{\sum_a a \cap q}$$

The scenario efficiency $F_q$ reflects the count of cases of allowed actions under that prediction over the count of all cases for that prediction. For the example above using the table 506, the efficiency score is computed as follows:

$$F_{safe} = \frac{15+3}{15+2+3} = 0.9$$

and $$F_{dangerous} = \frac{8}{1+8+1} = 0.8$$

In one example, the efficiency score of the operator is given as a weighted average of the scenario efficiency for all predictions as follows:

$$\sum_q = F_q * W_q$$

The weights $W_q$ for each prediction may be determined based on the relevance of the prediction for the assessment of the model. For the example of events such as dangerous cornering events, embodiments may be more concerned with missed alarms (dangerous cornering detection with a safe prediction) than with false alarms (safe cornering events with a dangerous prediction).

If a weight of 0.7 is given for a safe prediction and a weight of 0.3 is given for a dangerous prediction, the operator efficiency score is as follows:

$$\text{Efficiency Score} = (0.7 * 0.9) + (0.3 * 0.8) = 0.87$$

Once the efficiency score is obtained or determined, the performance of the model can be assessed 322. For example, the assessment or analysis may demonstrate that the model accurately captures the behavior of some operators, but not other operators. The analysis may demonstrate that some operators do not act on the model recommendations (e.g., alarms) while other operators act on the model recommendations. Further, the model may be more accurate for certain trajectory classes or that the actions of the operators reflect the model predictions only for those accuracies.

Figure 6:
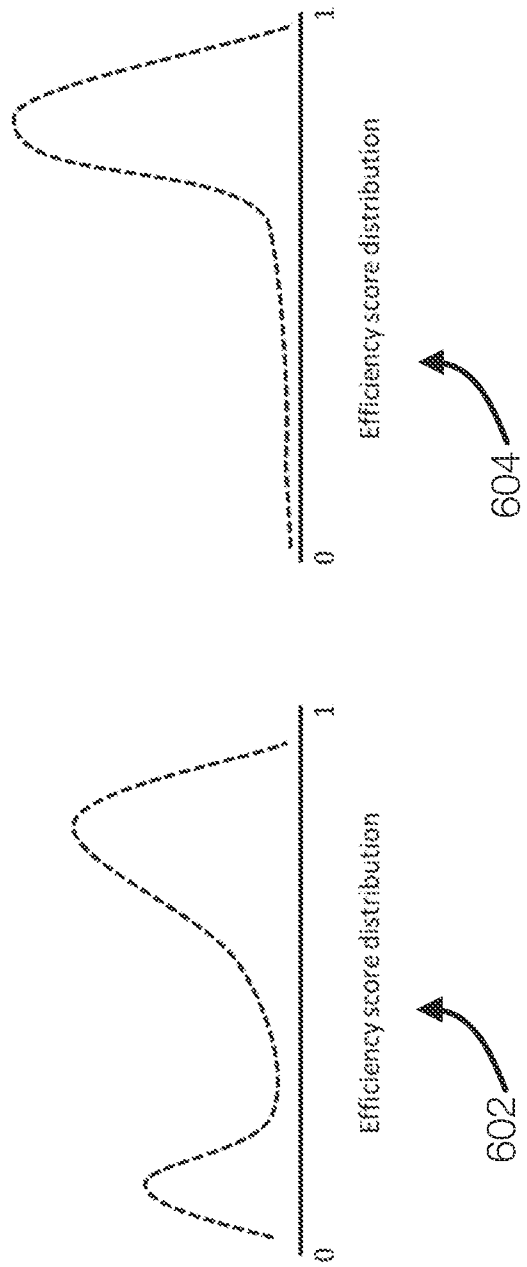
FIG. 6 discloses aspects of score distributions associated with model assessments.

FIG. 6 discloses two representative efficiency score distributions. FIG. 6 illustrates a bi-modal distribution 602 and a well-behaved distribution 604. If the model is associated with the distribution 602, this may indicate that all thresholds under a threshold may be of interest for model re-assessment. A coherent set of scenarios under the threshold can be identified (e.g., a set of trajectory classes, a set of operators) and the model can be retrained or monitored for further consideration. The distribution 604 indicates that that model is adequately capturing the events in the domain, or the operators are reacting to the actual environment in accordance with the model predictions.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistic operations.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client (e.g., a node) may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, video data, sensor data, data segments such as may be produced by data stream segmentation processes, data chunks, data blocks, atomic data, or the like.

Example embodiments of the invention are applicable to any system capable of storing and handling various types of objects, in analog, digital, or other form. Although terms such as file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited. Each of the Figures may disclose aspects of structure and methods.

Following are some further example embodiments of the invention. These are presented only by way of example and are not intended to limit the scope of the invention in any way.

Embodiment 1. A method, comprising: receiving a tuple from a node, wherein the tuple relates an operator identifier to an inference, a class, and an operator action, wherein the inference is generated by a model operating on the node, storing the tuple in a table that includes a plurality of tuples, generating a prediction-action table that is associated with an operator and a class, generating an efficiency score from the prediction-action table for the model, determining an efficiency score distribution for the model for the class; and assessing a quality of a performance of the model based on the efficiency score and the efficiency score distribution.

Embodiment 2. The method of embodiment 1, wherein the inference is Boolean and includes two types, further comprising generating a scenario efficiency for each output type.

Embodiment 3. The method of embodiment 1 and/or 2, further comprising weighting each of the scenario efficiencies and summing the weighted scenario efficiencies to determine the efficiency score.

Embodiment 4. The method of embodiment 1, 2, and/or 3, wherein an efficiency score is generated for each of the classes represented in the table.

Embodiment 5. The method of embodiment 1, 2, 3, and/or 4, further comprising generating the inference based on sensor data collected from sensors operating at the node.

Embodiment 6. The method of embodiment 1, 2, 3, 4, and/or 5, further comprising determining a trajectory class from the sensor data.

Embodiment 7. The method of embodiment 1, 2, 3, 4, 5, and/or 6, further comprising training the model.

Embodiment 8. The method of embodiment 1, 2, 3, 4, 5, 6, and/or 7, further comprising determining an efficiency score distribution for the model for additional classes and assessing the quality of the performance of the model for the additional classes.

Embodiment 9. The method of embodiment 1, 2, 3, 4, 5, 6, 7, and/or 8, further comprising retraining the model for scenarios under a threshold efficiency score.

Embodiment 10. The method of embodiment 1, 2, 3, 4, 5, 6, 7, 8, and/or 9, further comprising determining the class from the sensor data using a first model and determining the inference from a second model.

Embodiment 11. The method of embodiment 1, 2, 3, 4, 5, 6, 7, 8, 9, and/or 10, wherein the class is a trajectory class, wherein the model detects cornering events and wherein the inference determines whether the cornering event is safe or dangerous, wherein the action identifies an action of the operator that correlates to the trajectory class, the inference, and the operator identifier.

Embodiment 12. A method for performing any of the operations, methods, or processes, or any portion of any of these, or any combination thereof disclosed herein.

Embodiment 13. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
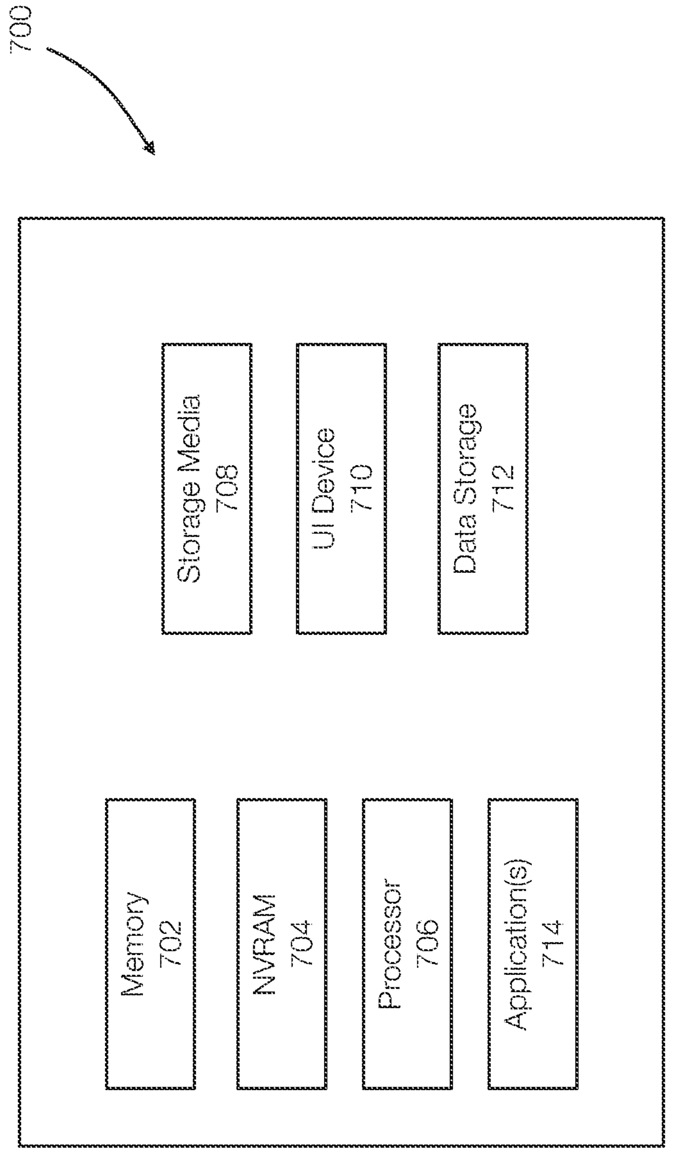
FIG. 7 discloses aspects of a computing device, a computing system, or a computing entity.

With reference briefly now to FIG. 7, any one or more of the entities disclosed, or implied, by Figures and/or elsewhere herein, may take the form of, or include, or be implemented on, or hosted by, a physical computing device, one example of which is denoted at 700. As well, where any of the aforementioned elements comprise or consist of a container or a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein. The device 700 may alternatively represent a computing system, a cloud or edge environment, a node, or the like or combination thereof.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for assessing a quality of a performance of a model in an unsupervised manner without labelled data, the method comprising:

receiving tuples from a node comprising one or more sensors, wherein each tuple includes an operator identifier of a human operator, an inference, a class, and an operator action done by the human operator, wherein the operator action is captured by a portion of the one or more sensors and generated by the model based on sensor data collected by the portion of the one or more sensors, wherein the inference is predicted by the model operating on the node based on the sensor data collected by the portion of the one or more sensors, wherein the inference represents an indication of an event, and wherein the class, for each of the tuples, is one of multiple classes and is a trajectory class which is determined from the sensor data;

storing the tuples in a first table;

generating a second table that associates the human operator with classes from the first table;

generating a prediction-action table that associates the inference to the operator action using a specific class from the second table, wherein the prediction-action table captures relationships between inferences and operator actions;

generating an efficiency score from the prediction-action table by comparing the inference and the operator action in each tuple;

determining an efficiency score distribution for the class;

assessing quality of the performance of the model based on the efficiency score and the efficiency score distribution; and retraining the model when the efficiency score distribution indicates that the human operator is not reacting in accordance with the inferences.

2. The method of claim 1, wherein the inference is Boolean and includes two types, and wherein the method further comprises generating a scenario efficiency for each of the two types.

3. The method of claim 2, further comprising weighting each of the scenario efficiencies and summing the weighted scenario efficiencies to determine the efficiency score.

4. The method of claim 3, wherein an efficiency score is generated for each of the classes represented in the second table.

5. The method of claim 4, further comprising generating the inference based on sensor data collected from sensors operating at the node.

6. The method of claim 1, further comprising training the model.

7. The method of claim 1, further comprising determining an efficiency score distribution for the model for each of the classes and assessing the quality of the performance of the model for each of the classes.

8. The method of claim 7, further comprising retraining the model for scenarios under a threshold efficiency score.

9. The method of claim 8, further comprising determining the class from sensor data generated at the node using a first model and determining the inference from a second model.

10. The method of claim 1, wherein the model detects cornering events, wherein the inference determines whether the cornering event is safe or dangerous, and wherein the operator action is correlated to the trajectory class, the inference, and the operator identifier.

11. A non-transitory storage medium having stored therein instructions that are executable by one or more hardware processors to perform operations for assessing a quality of a performance of a model in an unsupervised manner without labelled data, the operations comprising:

receiving tuples from a node comprising one or more sensors, wherein each tuple includes an operator identifier of a human operator, an inference, a class, and an operator action done by the human operator, wherein the operator action is captured by a portion of the one or more sensors and generated by the model based on sensor data collected by the portion of the one or more sensors, wherein the inference is predicted by the model operating on the node based on the sensor data collected by the portion of the one or more sensors, wherein the inference represents an indication of an event, and wherein the class, for each of the tuples, is one of multiple classes and is a trajectory class, which is determined from the sensor data;

storing the tuples in a first table;

generating a second table that associates the human operator with classes from the first table;

generating a prediction-action table that associates the inference to the operator action using a specific class from the second table, wherein the prediction-action table captures relationships between inferences and operator actions;

generating an efficiency score from the prediction-action table by comparing the inference and the operator action in each tuple;

determining an efficiency score distribution for the class;

assessing the quality of the performance of the model based on the efficiency score and the efficiency score distribution; and retraining the model when the efficiency score distribution indicates that the human operator is not reacting in accordance with the inferences.

12. The non-transitory storage medium of claim 11, wherein the inference is Boolean and includes two types, and wherein the operations further comprise generating a scenario efficiency for each of the two types.

13. The non-transitory storage medium of claim 12, wherein the operations further comprise weighting each of the scenario efficiencies and summing the weighted scenario efficiencies to determine the efficiency score.

14. The non-transitory storage medium of claim 13, wherein an efficiency score is generated for each of the classes represented in the second table.

15. The non-transitory storage medium of claim 14, wherein the operations further comprise generating the inference based on sensor data collected from sensors operating at the node.

16. The non-transitory storage medium of claim 11, wherein the operations further comprise training the model.

17. The non-transitory storage medium of claim 11, wherein the operations further comprise determining an efficiency score distribution for the model for each of the classes and assessing the quality of the performance of the model for each of the classes.

18. The non-transitory storage medium of claim 17, wherein the operations further comprise:

retraining the model for scenarios under a threshold efficiency score;

determining the class from sensor data generated at the node using a first model; and determining the inference from a second model, wherein the class is the trajectory class, wherein the model detects cornering events, wherein the inference determines whether the cornering event is safe or dangerous, and wherein the operator action is correlated to the trajectory class, the inference, and the operator identifier.

* * * * *